Figure 1:
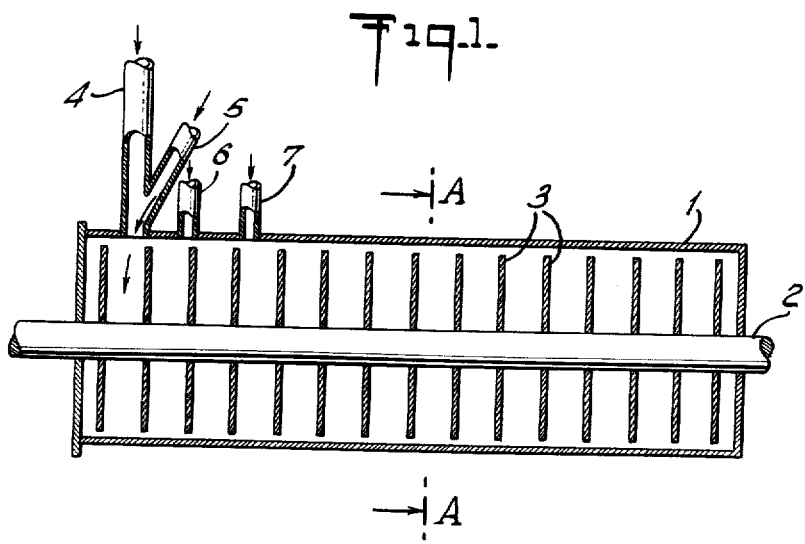

Oct. 29, 1963 G. M. BARCLAY 3,108,982
PROCESS OF COAGULATING CARBON BLOCK-SYNTHETIC
RUBBER LATEX MASTERBATCHES
Filed April 15, 1960

INVENTOR
GERALD M. BARCLAY
BY
ATTORNEY

United States Patent Office 3,108,982
Patented Oct. 29, 1963

3,108,982
PROCESS OF COAGULATING CARBON BLACK-SYNTHETIC RUBBER LATEX MASTERBATCHES
Gerald M. Barclay, Baytown, Tex., assignor, by mesne assignments, to Ashland Oil & Refining Company, Ashland, Ky., a corporation of Kentucky
Filed Apr. 15, 1960, Ser. No. 22,460
12 Claims. (Cl. 260—33.6)

This invention relates to the preparation of carbon black-synthetic rubber masterbatches. More particularly, it relates to the processing of carbon black-synthetic rubber latex masterbatches. Still more particularly, it relates to an improved process of coagulating carbon black-synthetic rubber latex masterbatches.

Synthetic rubber latices are prepared, in general, by the emulsion polymerization of a butadiene-1,3 or mixtures thereof, or by the polymerization of a butadiene-1,3 with other compounds polymerizable therewith. Polymerization is conducted in an aqueous medium using any of various polymerization recipes. The reaction is short-stopped at the desired point and is stripped of monomers, after which the resultant latex is directly coagulated or combined with carbon black to form a black-latex masterbatch. The carbon black employed in the preparation of such a masterbatch is usually in the form of an aqueous dispersion which may or may not contain a dispersing agent for the black. In either event, the resultant black-latex masterbatch is coagulated with salt and/or acid followed by washing, filtering and drying operations.

It is known that black-latex masterbatches can be coagulated using only an acid, such as a mineral acid, by adding acid to the masterbatch and agitating in a convetional coagulating tank. By such a procedure, however, it is difficult to control the tack and particle size of the resultant coagulum or crumb so as to render it easily amenable to further treatment in conventional finishing equipment. Particularly is this true when treating masterbatches containing a dispersing agent for the black. Accordingly, the usual practice has been to coagulate such masterbatches by adding both salt and acid thereto since the presence of salt appears to provide the necessary control of crumb, tack and particle size. Nevertheless, the advantages gained by the use of salt are at least in part offset by certain disadvantages. For instance, it has been shown that residual salt in the coagulum has an adverse effect on its heat stability during subsequent treatment thereof. The high water soluble ash content of the final product, moreover, seriously affects its quality for certain uses. Although the use of coagulating systems comprising materials other than salt and acid have been suggested, for example alum and glue-acid, the introduction into the rubber of such quality affecting impurities is also a disadvantage thereof.

More recently, it has been suggested to coagulate latices, including black-latex masterbatches, under high shear by adding acid to the black-latex masterbatch and subjecting the resultant mixture to concurrent turbulent agitating and comminuting actions. The result, in general, is a crumb of uniform particle size substantially free of fines which may be readily processed in conventional finishing equipment to a product free of the disadvantages inherent in a product produced by conventional salt-acid coagulation. Such a coagulating procedure forms the subject matter of copending application for U.S. Letters Patent Serial No. 22,461, filed April 15, 1960, of Gerald M. Barclay, the applicant herein.

The increasing demand for even more highly loaded carbon black-rubber masterbatches particularly those containing the higher reinforcing carbon blacks such as the ISAF and SAF types, however, has created new coagulating and processing problems. For instance, the coagulation of highly loaded black-latex masterbatches by conventional means results in a powdery crumb poor in tack. Much of the fines of such a crumb are lost in the washing and filtering operation. The remainder is carried through the drying step forming a heavy, dense cake difficult to dry and bale. The process forming the subject matter of the above described application greatly minimizes the formation of fines when practiced on such highly loaded black-latex masterbatches, although it is not as effective in this respect as when practiced on lower loaded masterbatches. In addition, the coagulum so produced appears to lack the tack necessary to produce a masterbatch bale having the preferred properties and appearance.

There exists, therefore, a demand for an improved process of coagulating black-latex masterbatches, particularly highly loaded black-latex masterbatches. It is a principal object of this invention to fulfill this demand. It is a further object of this invention to provide a process for coagulating black-latex masterbatches in the substantial absence of salt but which process, at the same time, exhibits the advantages attributable to the use of salt. It is a further object of this invention to produce a coagulum or crumb of a uniform particle size having a low fines content and a degree of tack amenable to ready drying and baling in conventional equipment. It is an additional object of this invention to provide such a process which may be practiced in an efficient and economical manner in equipment that is neither unusual nor costly and with a minimum of supervisory control of operating personnel.

According to the process of this invention, these objects have been met in a surprisingly effective manner. In general, the process comprises forming an acidified aqueous dispersion of carbon black. This acidified dispersion is then mixed with a synthetic latex and the resultant mixture preferably subjected to concurrent agitating and comminuting actions. On completion of soap conversion, the resultant coagulum is separated, and further processed in conventional equipment.

Although the process of this invention is particularly concerned with the coagulation of latices obtained by the emulsion polymerization of butadiene-1,3 with styrene using a soap type emulsifier such as a rosin acid or fatty acid soap, nevertheless, it is just as applicable to the coagulation of other synthetic latices similarly produced. By the latter is meant those latices formed by the emulsion polymerization of a butadiene-1,3 such as butadiene-1,3, methyl-2-butadiene-1,3, chloro-2-butadiene-1,3, piperylene-2,3-dimethyl butadiene-1,3 and the like as well as mixtures thereof. Also intended to be included are those latices formed by the emulsion polymerization of butadiene-1,3 with one or more compounds polymerizable therewith containing a terminal $CH_2=C<$ group. Examples of such compounds are aryl olefins including styrene mentioned above such as $\alpha$-methylstyrene, p-chlorostyrene and the like; and the $\alpha$-methylene carboxylic acids, their esters and nitriles such as acrylic acid, methyl acrylate, methyl methacrylate, acrylonitrile, methacrylonitrile, methyl vinyl ether, methyl vinyl ketone and the like.

The process may be practiced on carbon black-synthetic latex masterbatches with or without an extender oil. The particular types of blacks employed are those normally employed in masterbatching although the method shows to best advantage when the black is a highly reinforcing black such, for instance, as the types known as ISAF and SAF blacks. The masterbatch may be one in which the aqueous carbon black slurry employed in the preparation of the masterbatch may have been prepared by either chemical or mechanical dispersion of the black in water, although the process has an added advantage when practiced on dispersing agent slurries, as will be subsequently described. The oil employed as an extender may be any hydrocarbon oil having the required properties for such use. The process, while being directed to all oil extended-black masterbatches, is particularly effective when practiced on latices highly loaded with the carbon black and oil. By highly loaded, according to this invention, is meant at least about 75 parts of black and at least about 37.5 parts of oil per 100 parts of polymer.

The particular manner in which the acidified aqueous carbon black dispersion is prepared forms no part of this invention and, accordingly, may vary as the particular operating conditions warrant. Preferably, however, the acid is added to the aqueous black dispersion after the latter has been formed, whether by chemical or mechanical dispersion. If an extender oil is to be incorporated in the masterbatch, it may be added at the same time and the entire slurry submitted to a blending operation. Alternatively, the extender oil may be added to the latex, or to the coagulating vessel as a third component with the latex and black dispersion. In any event, sufficient acid is added to the black dispersion to subsequently convert the soap content of the latex and coagulate the latter, the dispersion being subjected to adequate agitation to thoroughly distribute the acid.

Figure 2:
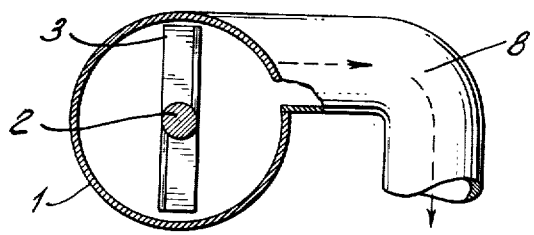

The resultant acidified black slurry is then brought together with the latex to effect coagulation of the latter. Coagulation may be practiced in any manner, although it has been found that the most effective by far is to subject the resultant masterbatch to a high mechanical shearing by submitting it to concurrent agitating and comminuting actions as described in the above mentioned application for U.S. Letters Patent. A particular means for conducting coagulation in this manner is also described therein. For a better understanding of such means reference is made to the attached drawing in which FIGURE 1 is a longitudinal sectional view of an illustrative coagulating device, while FIGURE 2 is an end view taken on the line A—A of FIGURE 1.

As shown in the drawing, the coagulating device comprises an elongated tubular coagulator 1 provided with a rotor 2, equipped with variable speed drive means carrying a plurality of sets of radially extending blades 3. The number of blades per set as well as the number of blade sets may both be varied but are in such relation to the dimensions of the coagulator 1 as to provide the necessary agitating and comminuting actions. As shown in FIGURE 2, the illustrative device has two blades per set, 180° removed from each other. The blade sets may be fixed to rotor 2 so as to provide a double helix running the length of coagulator 1, or they may be all carried in a similar position. Each blade, if desired, may be pitched to provide a pumping action, although the external pressures applied to the latex and black slurry entering the device is normally adequate to provide the necessary flow therethrough. One end of coagulator 1 is provided with means 4 and 5 for introducing latex and acidified carbon black slurry while ports 6 and 7 may be used for introducing extender oil and antioxidant. Alternatively, ports 6 and 7, or additionally provided ports not shown, may be employed for introducing water to control coagulating pH or for introducing steam to maintain proper coagulating temperature. At the opposite or discharge end of the coagulator is means 8 for discharging crumb for further treatment. It will be apparent to those skilled in the art, of course, that any of various modifications of the illustrated device may be readily arrived at in which may be carried out the described concurrent agitating and comminuting actions.

The acid employed for coagulation, whether it be by the above described process or not, may be any organic or mineral acid normally employed for this purpose in amounts and concentrations well known to those skilled in the art. The pH during coagulation is similar to that normally maintained in any coagulation, i.e., about 2.5–3.0. Coagulation temperature in the described coagulation process will vary to some extent with the particular masterbatch treated. In general, however, it may be stated that a temperature of about 95–125° F., has proved to be quite satisfactory. When coagulating as above by using concurrent agitating and comminuting actions, the particle size can be controlled to some extent by varying the intensity of the actions. In general, it can be stated that the softer and stickier the coagulum normally is, the more intense the agitating and comminuting actions must be to obtain the desired particle size. Insufficiently intense or excessively intense actions in any particular case may be expected to lead to soft chunky coagulum and coagulum comprising considerable amounts of fines, respectively. The intensity of actions required for the treatment of any particular latex is not an easily definable measurement. It depends on the means employed to obtain the agitating and comminuting actions and the length of time the latex is subjected to such actions in the particular means. For any particular coagulating device, however, the intensity and length of time of the agitating and comminuting actions necessary to obtain the desired results may be readily determined.

In practicing the process of this invention by coagulating as through the use of concurrent agitating and comminuting actions as provided, for instance, by the illustrated coagulating device, the latex and acidified carbon black slurry are brought together at a predetermined temperature, and are substantially immediately subjected to the violent agitation and comminution actions of the blades rotating at a predetermined speed. Conversion of the soap quickly occurs and the wet crumb or coagulum, substantially free of fines, is discharged and readily dried and baled in a conventional manner. When coagulation is practiced in this manner on a black-latex masterbatch in which the acid has been added to the black slurry, a coagulum containing less fines and having a tackier nature is obtained than when it is practiced on a masterbatch in which the acid is added directly to the masterbatch. This is particularly true of highly loaded black and oil masterbatches. The result is a corresponding decrease in loss of product in the form of fines and an easier and faster product to dry having superior baling characteristics. The process of this invention has an additional advantage when the acid is added to a black dispersion containing a dispersing agent since the acid tends to counteract the effect of the dispersing agent permitting the carbon black to more readily form a bond with the rubber particles in the latex.

The process of this invention has been described with respect to a particular coagulating procedure. It is just as applicable, however, with other coagulating procedures such, for instance, as those in which the coagulating system comprises salt-acid or glue-acid and in which concurrent agitating and comminuting actions are not employed. When so practiced, however, the advantages inherent in the use of acid alone are lost. Accordingly, this invention is preferably conducted with only an acid coagulant using concurrent agitating and comminuting actions in the substantial absence of salt as described. In addition to the other advantages specified, the preferred combination has been generally found to lead to somewhat improved tensile properties.

The process of this invention is further described in the following examples. These examples are illustrative only and not by way of limitation. Unless otherwise noted, all parts are by weight. The coagulating device employed in the examples for carrying out the process of this invention is similar to that illustrated in the drawing. It comprises a cylindrical shell having a length of 2 ft. and an inside diameter of 7 in. A variable speed rotor extends along the axis of the shell carrying 11 sets of unpitched blades equidistantly spaced from each other. The shell is provided with inlet ports for the latex or masterbatch, acid solution or acidified aqueous carbon black dispersion, water and steam as needed, and a discharge port for discharging coagulum to washing, filtering and drying.

EXAMPLE 1

In the preparation of an oil-extended black masterbatch having a composition comprising 100 parts polymer, 75 parts carbon black, 37.5 parts oil, there is employed an SBR latex of a high Mooney type synthetic rubber, a highly aromatic extender oil as a 50% aqueous dispersion and an 8% dispersion of ISAF black prepared without the use of a dispersing agent. Flow rates at which the latex, oil dispersion and black dispersion are brought together are 2.4, 0.37 and 4.35 gal./min., respectively. The resultant mixture is passed through a homogenizing zone and then to the coagulating device where 0.5% aqueous sulfuric acid is added at the rate of 1.2 gal./min. Rotor speed is 600 r.p.m. and coagulating temperature maintained at 100–110° F. Coagulating pH is approximately 3.0. Residence time is approximately 40 seconds. A crumb of a particle size ranging from ⅛″–¼″ is obtained. The residual liquor is dark and muddy from the high black loading indicating the presence of fines. On drying, the coagulum proves not to be particularly susceptible to ready baling because of its deficiency in tack.

EXAMPLE 2

The procedure of Example 1 is repeated except that the acid is added to the oil and black dispersion. The resultant mixture is passed through the homogenizer and then to the coagulator where the latex is added. A crumb of a more uniform particle size of about ¼″ is obtained. Residual liquor is white to clear in color indicating the absence of any substantial amount of fines. The coagulum has superior tack to that of Example 1 and has better baling characteristics.

EXAMPLE 3

The procedure of Example 2 is repeated using a styrene-butadiene latex having 23.5% bound styrene prepared by emulsion polymerization using a 50/50 mixture of rosin and fatty acid soaps. 75 parts of HAF black and 37.5 parts of an aromatic processing oil per 100 parts of polymer are employed. Similar results are obtained.

EXAMPLE 4

The procedure of Example 1 is repeated using styrene-butadiene latex having 23.5% bound styrene prepared by emulsion polymerization using a rosin acid soap, an HAF black and a naphthenic oil. The dispersion of black and oil is fed to the coagulator along with separate streams of acid and latex at rates such as to provide 52 parts of black and 10 parts of oil per 100 parts of polymer. Rotor speed was 700 r.p.m. and residence time about 30 seconds. The crumb size varies undesirably from ⅛″–⅜″ with some fines. The tackiness of the crumb is poor and makes baling difficult.

EXAMPLE 5

The procedure of Example 4 is repeated adding the acid to the black dispersion. A crumb of more uniform particle size of about ¼″ is obtained. Fewer fines and improved tack is shown.

EXAMPLE 6

The products of Examples 4 and 5 are made into compositions according to the following recipe.

| Constituent: | Parts |
|---|---|
| Black masterbatch | 145.5 |
| Zinc oxide | 3 |
| Stearic acid | 2.0 |
| Sulfur | 1.9 |
| N-cyclohexylbenzothiazole-2-sulfenamide | 0.9 |

Samples of the two compositions are then cured at 292° F. for periods of 15, 30, 45 and 60 minutes and tested for modulus, tensile and elongation. Results appear in Table I.

*Table 1*

| Time | Example 4 | | | Example 5 | | |
|---|---|---|---|---|---|---|
| | Modulus at 300% (p.s.i.) | Tensile (p.s.i.) | Elongation Percent | Modulus at 300% (p.s.i.) | Tensile (p.s.i.) | Elongation Percent |
| 15 | 310 | 1,200 | 950 | 240 | 650 | 930 |
| 30 | 1,360 | 3,590 | 640 | 1,360 | 3,360 | 610 |
| 45 | 1,680 | 3,630 | 530 | 1,800 | 3,810 | 530 |
| 60 | 1,840 | 3,690 | 530 | 1,890 | 3,650 | 510 |

The above data illustrate that tensile is somewhat better for the product prepared by the process of this invention (Ex. 5) while elongation and modulus are comparable.

Although the above examples illustrate the process of this invention specifically with respect to styrene-butadiene latices having high loadings of high reinforcing carbon blacks, the process is also applicable to the same as well as other latices and the same as well as other carbon blacks in which the black loading may be considerably varied. The process may also be practiced on latices that have been treated with an electrolyte, such as aqueous sodium chloride, to advantage particularly with high black loaded masterbatches in order to obtain improved product particle size and tack, although the advantages inherent in the use of acid alone are sacrificed.

I claim:
1. In a process for preparing a carbon black-synthetic rubber masterbatch in which a mixture comprising carbon black and a synthetic rubber latex is coagulated with an acid, the improvement which comprises: bringing together a synthetic rubber latex prepared by the emulsion polymerization of a member selected from the group consisting of a conjugated diolefin and a conjugated diolefin together with at least one additional monomer polymerizable therewith, and an aqueous carbon black dispersion, said dispersion having incorporated therein in acid in amount sufficient to substantially completely coagulate said latex; and recovering the resultant carbon black-synthetic rubber coagulum.

2. In a process for preparing a carbon black-synthetic rubber masterbatch in which a mixture comprising carbon black and a synthetic rubber latex is coagulated with an acid, the improvement which comprises: forming an aqueous dispersion comprising carbon black and an acid capable of coagulating a synthetic rubber latex prepared by the emulsion polymerization of a member selected from the group consisting of a conjugated diolefin and a conjugated diolefin together with at least one additional monomer polymerizable therewith; bringing said dispersion and a synthetic rubber latex of the type described together, the amount of said acid in said dispersion being such as to substantially completely coagulate said latex; subjecting the resultant mixture to concurrent agitating and comminuting actions whereby said latex and carbon black are substantially completely co-coagulated as a carbon black-synthetic rubber coagulum comprising particles of substantially uniform size and substantially free of fines; and recovering said carbon black-synthetic rubber coagulum.

3. A process for preparing a carbon black-synthetic rubber masterbatch which comprises: providing a synthetic rubber latex prepared by the emulsion polymerization of a member selected from the group consisting of a conjugated diolefin and a conjugated diolefin with at least one additional monomer polymerizable therewith in which the polymerization is conducted in the presence of at least one emulsifier selected from the group consisting of rosin acid soap and fatty acid soap, adding to said latex an aqueous dispersion of carbon black containing an acid capable of causing the coagulation of a latex of the type described, said acid concentration being such as to maintain a pH during coagulation of said latex of about 2.5–3.0; subjecting the resultant mixture to concurrent agitating and comminuting actions whereby said latex and carbon black are substantially completely coagulated as a carbon black-synthetic rubber coagulum comprising particles of substantially uniform size and substantially free of fines; and recovering said carbon black-synthetic rubber coagulum.

4. A process according to claim 3 in which the aqueous dispersion of carbon black also contains an extender oil.

5. A process according to claim 1 in which said aqueous dispersion is formed by adding said acid to an aqueous dispersion of carbon black.

6. A process according to claim 5 in which said aqueous dispersion of carbon black contains a dispersing agent.

7. A process according to claim 1 in which the recovered coagulum has a carbon black loading of at least about 75 parts per 100 parts of synthetic rubber.

8. A process according to claim 7 in which the carbon black is a high reinforcing type carbon black.

9. A process according to claim 8 in which the carbon black is ISAF.

10. A process according to claim 8 in which the carbon black is SAF.

11. A process according to claim 7 in which an extender oil is added to the latex prior to coagulation.

12. A process according to claim 11 in which the recovered coagulum has an oil loading of at least about 37.5 parts per 100 parts of synthetic rubber.

References Cited in the file of this patent

UNITED STATES PATENTS

| | | |
|---|---|---|
| 2,419,512 | Vesce | Apr. 22, 1947 |
| 2,955,097 | White | Oct. 4, 1960 |
| 2,972,473 | Heller | Feb. 21, 1961 |

UNITED STATES PATENT OFFICE
CERTIFICATE OF CORRECTION

Patent No. 3,108,982                     October 29, 1963

Gerald M. Barclay

It is hereby certified that error appears in the above numbered patent requiring correction and that the said Letters Patent should read as corrected below.

In the sheet of drawings, lines 2 and 3, title of invention, for "PROCESS OF COAGULATING CARBON BLOCK-SYNTHETIC RUBBER LATEX MASTERBATCHES" read -- PROCESS OF COAGULATING CARBON BLACK-SYNTHETIC RUBBER LATEX MASTERBATCHES --; column 5, line 10, after "8%" insert -- aqueous --; column 6, line 40, for "in", first occurrence, read -- and --.

Signed and sealed this 14th day of April 1964.

(SEAL)
Attest:

ERNEST W. SWIDER

Attesting Officer

EDWARD J. BRENNER

Commissioner of Patents